US009100802B2

(12) United States Patent
Islam et al.

(10) Patent No.: US 9,100,802 B2
(45) Date of Patent: Aug. 4, 2015

(54) METHOD AND APPARATUS TO CONCURRENTLY NOTIFY EMERGENCY CONTACTS DURING AN EMERGENCY VOICE CALL BASED ON NETWORK CAPABILITY

(75) Inventors: Muhammad Khaledul Islam, Ottawa (CA); Jean-Philippe Cormier, Ottawa (CA); Farhad Ahmed, Kanata (CA)

(73) Assignee: BlackBerry Limited, Waterloo (CA)

( * ) Notice: Subject to any disclaimer, the term of this patent is extended or adjusted under 35 U.S.C. 154(b) by 623 days.

(21) Appl. No.: 11/377,182

(22) Filed: Mar. 17, 2006

(65) Prior Publication Data
US 2007/0218925 A1    Sep. 20, 2007

(51) Int. Cl.
| H04W 4/00 | (2009.01) |
| H04W 4/12 | (2009.01) |
| H04W 4/14 | (2009.01) |
| H04W 4/22 | (2009.01) |
| H04W 76/00 | (2009.01) |

(52) U.S. Cl.
CPC . *H04W 4/12* (2013.01); *H04W 4/14* (2013.01); *H04W 4/22* (2013.01); *H04W 76/007* (2013.01)

(58) Field of Classification Search
CPC . H04W 4/22; H04W 76/007; H04W 52/0277; H04W 52/0261
USPC ............. 455/404.1, 412.1, 412.2, 456.1, 466, 455/564, 404.2, 90.1; 370/338, 352, 353, 370/354, 355
See application file for complete search history.

(56) References Cited

U.S. PATENT DOCUMENTS

| 5,937,355 | A  * | 8/1999 | Joong et al. ................... 455/466 |
| 6,240,285 | B1 * | 5/2001 | Blum et al. ................ 455/404.1 |
| 6,397,054 | B1 * | 5/2002 | Hoirup et al. .............. 455/404.1 |
| 6,408,172 | B1 * | 6/2002 | Alperovich et al. ....... 455/404.1 |
| 6,671,513 | B1   | 12/2003 | Frank et al. |
| 2002/0001317 | A1 * | 1/2002 | Herring ........................ 370/493 |
| 2002/0037750 | A1 * | 3/2002 | Hussain et al. .............. 455/564 |
| 2002/0077075 | A1 * | 6/2002 | Ikonen et al. ................. 455/404 |
| 2004/0107128 | A1 * | 6/2004 | Weaver ........................... 705/10 |
| 2004/0198413 | A1 * | 10/2004 | Smith et al. ............... 455/550.1 |
| 2004/0203622 | A1 * | 10/2004 | Esque et al. ................ 455/412.1 |
| 2005/0101288 | A1 * | 5/2005 | Hulkkonen et al. ........ 455/404.1 |
| 2005/0151642 | A1   | 7/2005 | Tupler et al. |
| 2005/0159142 | A1 * | 7/2005 | Giniger et al. ............. 455/414.3 |
| 2005/0197137 | A1 * | 9/2005 | Radic et al. ................ 455/456.1 |
| 2007/0142026 | A1 * | 6/2007 | Kuz et al. ................... 455/404.1 |

FOREIGN PATENT DOCUMENTS

| EP | 1 024 676 A1 * | 8/2000 | ............. H04Q 7/38 |
| JP | 2004147330 A   * | 5/2004 | |
| WO | 02/096138      | 11/2002 | |

OTHER PUBLICATIONS

Kobayashi, Nobuaki : "portable communication device"; May 20, 2004, JP 2004147330, Japanese to English Machine Translation.*

* cited by examiner

*Primary Examiner* — Liton Miah
(74) *Attorney, Agent, or Firm* — Moffat & Co.

(57) ABSTRACT

A method and apparatus for automatically sending a data message from a mobile device to at least one recipient during or soon after an emergency voice call, the method having the steps of: determining whether the data message can be sent over the network during the emergency voice call, and if yes, creating and sending the data message; and if no, waiting until either the mobile device connects to a new network, wherein the method proceeds back to said determining step, or until the voice call has ended and then creating and sending the data message.

22 Claims, 2 Drawing Sheets

METHOD AND APPARATUS TO CONCURRENTLY NOTIFY EMERGENCY CONTACTS DURING AN EMERGENCY VOICE CALL BASED ON NETWORK CAPABILITY

BACKGROUND

1. Field of Disclosure

The present disclosure relates to the field of communications and more particularly to emergency notification in a mobile device having both voice and data capabilities.

2. Description of the Related Prior Art

In an emergency situation, it may be desirable to automatically notify predetermined emergency contacts through a data message when a user places an emergency call. Current solutions require a user to notify emergency contacts manually after the emergency voice call has ended if the user decides to do so or more specifically if the user in a position to do so.

As will be understood by those in the art, there is a lack of support of concurrent voice and packet data services on some current wireless networks, such as CDMA (IS-2000 release 0) or Class B GSM/GPRS. As a result, a mobile device typically suspends all existing packet data activities when a call is placed to a valid emergency number, for example, 911 in Canada and the United States, 112 in parts of Europe, 999 in parts of Africa and Asia, among others. In some implementations, the mobile device enters emergency callback mode after the emergency call ends. During this callback period, the mobile device prevents any packet data attempts from the device in order to enhance the likelihood of reception of possible callback from the emergency service centre.

New 3G networks such as UMTS or IS-2000 release A/onwards support concurrent voice and packet data sessions. An always-on mobile device is expected to maintain IP connectivity (e.g. PPP or PDP) at all times. There is no need to suspend packet data activities if the device is in a network that supports concurrent voice and packet data sessions.

BRIEF DESCRIPTION OF THE DRAWINGS

A better understanding of the present disclosure will be obtained by considering the detailed description below, with reference to the following drawings in which.

DESCRIPTION OF THE PREFERRED EMBODIMENT

Figure 1:
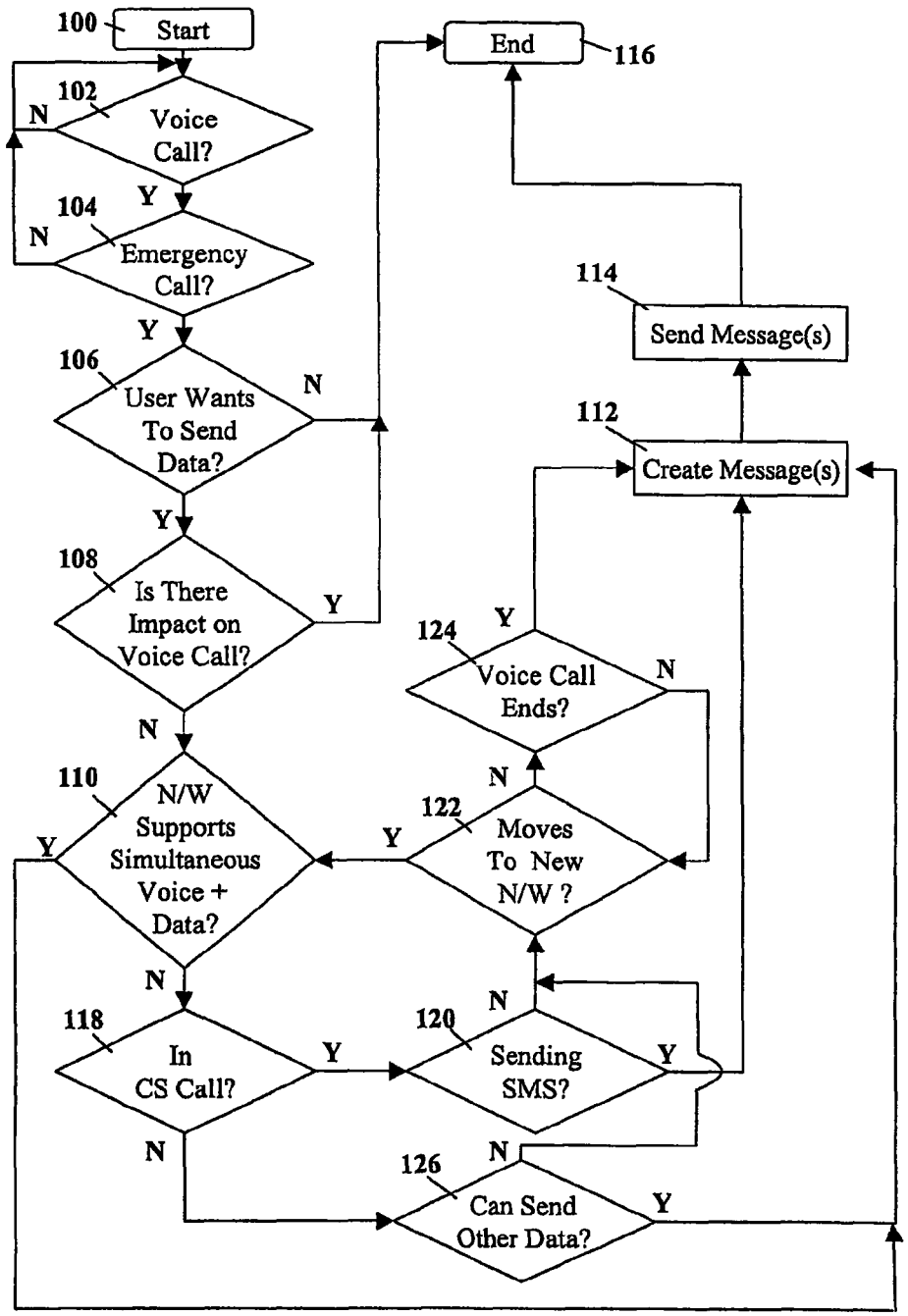
FIG. 1 is a flowchart illustrating a sequence of operations by the mobile device when a user makes an emergency voice call that involves concurrently notifying emergency contacts.

The present method and apparatus allow for an emergency notification data message to be sent at the earliest opportunity by providing for a mobile device that can initiate a packet data call to notify (e.g. in the form of an urgent e-mail) user-defined emergency contacts whenever a call is placed to an emergency number. The notification is sent as long as there is no impact to the emergency voice call itself. If the device is not in a network that supports concurrent voice and data when the emergency call is made, then the device waits until it enters a network that supports such capability and automatically notifies emergency contacts. Contents of the notification may include time stamp of emergency call, type of emergency if information is available (such as fire, police), location information (at least based on the information provided by wireless network such as Mobile Country Code (MCC), Mobile Network Code (MNC), System Id (SID), Base Station Cell ID, etc.) including GPS data such as latitude/longitude/height if the mobile device has standalone or assisted GPS capability and other relevant information.

The present method can further be extended to networks that do not support concurrent voice and packet data sessions, but do provide other forms of communications during voice call. For example, if SMS can be sent to emergency contacts during emergency calls, where the SMS destination could be a phone number or an email address (e.g. in a CDMA network) or a combination of both, an SMS could be sent to during the emergency call. Alternatively, the emergency contact information can be created and sent automatically once the voice call ends.

The present disclosure therefore provides a method for automatically sending a data message from a mobile device to at least one recipient during or after an emergency voice call, the method comprising the steps of: determining whether the data message can be sent over the network during the emergency voice call, and if yes, creating and sending the data message; and if no, waiting until either the mobile device connects to a new network, wherein the method proceeds back to said determining step, or until the voice call has ended and then creating and sending the data message.

The present disclosure further provides a mobile device adapted to automatically send a data message from to at least one recipient during an emergency voice call, the mobile device having a radio subsystem including a radio adapted to communicate with a mobile network; a radio processor having a digital signal processor and adapted to interact with said radio subsystem; memory; a user interface; a processor adapted to run user applications and interact with the memory, the radio and the user interface and adapted to run applications, the mobile device characterized by having means for: determining whether the data message can be sent over the network during the emergency voice call, and if yes, creating and sending the data message; and if no, waiting until either the mobile device connects to a new network, wherein the mobile device proceeds back to said determining step, or until the voice call has ended and then creating and sending the data message.

Reference is now made to FIG. 1. FIG. 1 is a flow chart illustrating exemplary method according to the present disclosure. The process of FIG. 1 is started at step 100 and the process first proceeds to step 102.

In step 102, the process determines whether a voice call is being made. If no voice call is being made, the process proceeds back to step 102 in which it continues to check if a voice call is made.

Once a voice call is made, the process proceeds from step 102 to step 104. In step 104, a check is made whether or not the voice call is an emergency call. As will be appreciate by those skilled in the art, the determination of whether the voice call is an emergency call could be based on the number that the user dialed. Specifically, the mobile device could include a table or list of emergency numbers based on geographical locations, and the mobile device could determine whether the number dialed is within the list of emergency numbers. For example, in Canada, dialing 911 is considered to be an emergency call. In the UK, 112 or 999 are considered to be emergency numbers. Further, in some countries, such as Switzerland, various numbers exist to indicate the type of emergency. In Switzerland, 144 is used for medical emergencies, 118 is used for fire department emergencies, and 117 is used for police emergencies.

As will be appreciated by those skilled in the art, the mobile device could consider the number dialled to be an emergency number if it matches any of the numbers in the list of emergency numbers stored on the mobile device. Thus if 999 is dialled anywhere in the world, since this number appears in the list of emergency numbers it is considered to be an emergency number for step 104.

Alternatively, the mobile device could check to see whether the network that it is connected to is geographically located in an area that includes the number dialed as an emergency number. Thus a user dialing 999 in Canada will not be considered to be an emergency number, whereas 911 would be considered an emergency number for step 104.

If the process determines, in step 104, that the call is not an emergency call, the process proceeds back to step 102 in which it continues to determine whether a voice call has been made.

If in step 104 it is determined that an emergency call was made, the process proceeds to step 105 in which a check is made to see whether a user wants to send data concurrently with an emergency call. As will be appreciated by those skilled in the art, this can be predetermined by a user and set within the user's settings. For example, the user can preprogram the mobile device to include an option to send data on an emergency call to a specific list of recipients. The user may customize the information that is sent to recipients as well as specifying the type of data message to be sent and the recipients of such data messages.

In step 106, it is determined whether the user wants to send data. If the user does not want to send data then the process proceeds to step 116 in which the process is ended. Step 106 is a check by the mobile device for a preconfigured option, such as a variable preset to indicate that emergency contacts should be notified during an emergency voice call. Thus, during an actual emergency, the user does not need to intervene to send the notification, but prior to an emergency situation the user can configure the mobile device to indicate whether data should be sent in an emergency or whether to turn this option off.

Conversely, if the user wants to send data, the process proceeds to step 108 in which it is determined whether sending data has any impact on the voice call. This could, for example, include a check of battery level to determine whether or not a data call will adversely affect the voice call by draining already low battery resources.

If the sending of data would adversely impact the voice call, the process proceeds to step 116 and ends. Conversely, if in step 108 it is determined that there would be no adverse impact on the voice call, for example, if the battery level is above a certain threshold, the process proceeds to step 110 in which it is determined whether the network supports concurrent voice and data. As will be appreciated by those skilled in the art, certain third generation networks, such as CDMA2000 (IS-2000 Release A and later) and UMTS networks support both concurrent voice and data.

If both voice and data are supported concurrently, the process proceeds to step 112 in which a message is created. As indicated above, the contents of the message can be predetermined by the user. The message could utilize information that is known by the mobile device such as the location of the mobile device. The location of the mobile device can be determined either through a GPS system within the mobile device, or at least based on the network and the base station that the mobile device is connected to (such as MCC/MNC, Cell ID, etc.).

Other information that could be in the message include the emergency numbers dialed. This may provide recipients of the message with information as to the type of emergency that the user is experiencing. For example, in certain countries different emergency numbers are dialed for ambulance, police or fire services and thus the emergency number dialed could indicate to a recipient the type of emergency. Further, the mobile device could from a table insert the type of emergency service that is being requested into the body of the message.

A time stamp (e.g. UTC time with local time offset) could also be placed in the message.

From step 112, the process proceeds to step 114 in which the message is sent and then to step 116 in which the process is ended.

As will be appreciated by those skilled in the art, the message created in step 112 could be an email message. However, it could also be any other type of data message, and could include other forms of messages such as SMS. Other forms of communication such as instant messaging are also contemplated to be within the scope of the present disclosure.

If, in step 110, it is determined that the network does not support concurrent voice and data, the process proceeds to step 118. In step 118, the process checks to see whether the voice call of step 102 is a circuit switched (CS) call. As will be appreciated by those skilled in the art, the voice call in step 102 could either be a circuit switched or a packet switched call. In the case of a packet switched call, the call could be made over Voice over Internet Protocol (VoIP).

If, in step 118, it is determined that the call is a circuit switched call, the process proceeds to step 120 in which it checks to see whether the data can be sent over the circuit switched network. For example, in step 120 a check could be made to see whether it is acceptable to send an SMS message over the circuit switched network. Other examples of messages that could be sent over the circuit switched network would be known to those skilled in the art.

If in step 120 it is determined that a message can be sent over the circuit switched network then the process proceeds to step 112 in which a message is created, step 114 in which the message is sent and step 116 to end the process.

Conversely, if the data cannot be sent over the circuit switched networks, the process proceeds from step 120 to step 122 in which a check is made to determine whether the mobile device has moved to a new network. As will be appreciated by those skilled in the art, an always-on device will prefer to be in a network that supports concurrent voice and data. In this case, it could be searching for a network to connect to that supports both voice and data concurrently, and when it determines that such a network is available, the mobile device could initiate a connection to that network immediately.

If in step 122 it is determined that the mobile has not moved to a new network, the mobile proceeds to step 124 in which it checks to see whether the voice call has ended. As will be appreciated by those skilled in the art, if the voice call ends, the data can be sent immediately afterwards in an automatic fashion by proceeding from step 124 to step 112 to create the message and to step 114 to send the message, before ending the process in step 116.

If a new network has not been connected to in step 122 and the voice call has not ended, as determined in step 124, the checks in step 122 and 124 are repeated until one of the two events occur.

If in step 122 it is determined that the mobile device has moved to a new network, the process proceeds to step 110 in which it checks to see whether the new network supports concurrent voice and data and continues as described above.

If, in step 118, it is determined that the mobile device is not in a circuit switched call, the proceeds to step 126 in which it checks whether data can be sent concurrently in the packet switched call. As will be appreciated by those skilled in the art, since the call is not in a circuit switched call it is in a packet switched call, such as VoIP, and it is possible that other data could be sent concurrently.

If, in step 126, it is determined that an attempt to send a message using the packet switched domain is unsuccessful or not possible then the process proceeds to step 122 in which it checks to see whether the mobile has connected to a new network and continues as described above. Conversely, if the mobile device can send a message over the packet switched domain as determined in step 126, the process proceeds to step 112 in which a message is created, step 114 in which the message is sent and to step 116 in which the process is ended.

As will be appreciated by those skilled in the art, the present method and apparatus could be useful in a number of situations. For example, a truck driver that is involved in an accident may initiate an emergency 911 call in Canada or the United States. In this case, the company that the truck driver works for could be contacted immediately through the email, SMS message or other data message to allow the company to initiate its own emergency procedures or to merely inform the company that one of its trucks is experiencing an emergency. Similarly, business travelers could use the above method and apparatus to inform their family, employer and other interested parties when they are in an emergency situation. As will be appreciated, the number of people contacted through the data message is not limited and could in some cases be all of the contacts within the user's address book. Other situations would be known to those skilled in the art.

The diagram of FIG. 1 indicates that the process loops back to step 102 if a voice call is not detected or the voice call is not an emergency call. However, as will be appreciated by those skilled in the art, a loop is not necessarily implemented in practice. For example, the process may not start until a voice call is initiated. Alternatively, a voice call could cause an interrupt which would cause the process to move to step 104. Other alternatives would also be known to those skilled in the art.

As will be further appreciated by those skilled in the art, the step of checking whether the user wants to send data in step 106 could be used to preempt the process in general. Thus, if a mobile device setting is set to disable the option of sending data, the process may never be started in the first place.

Figure 2:
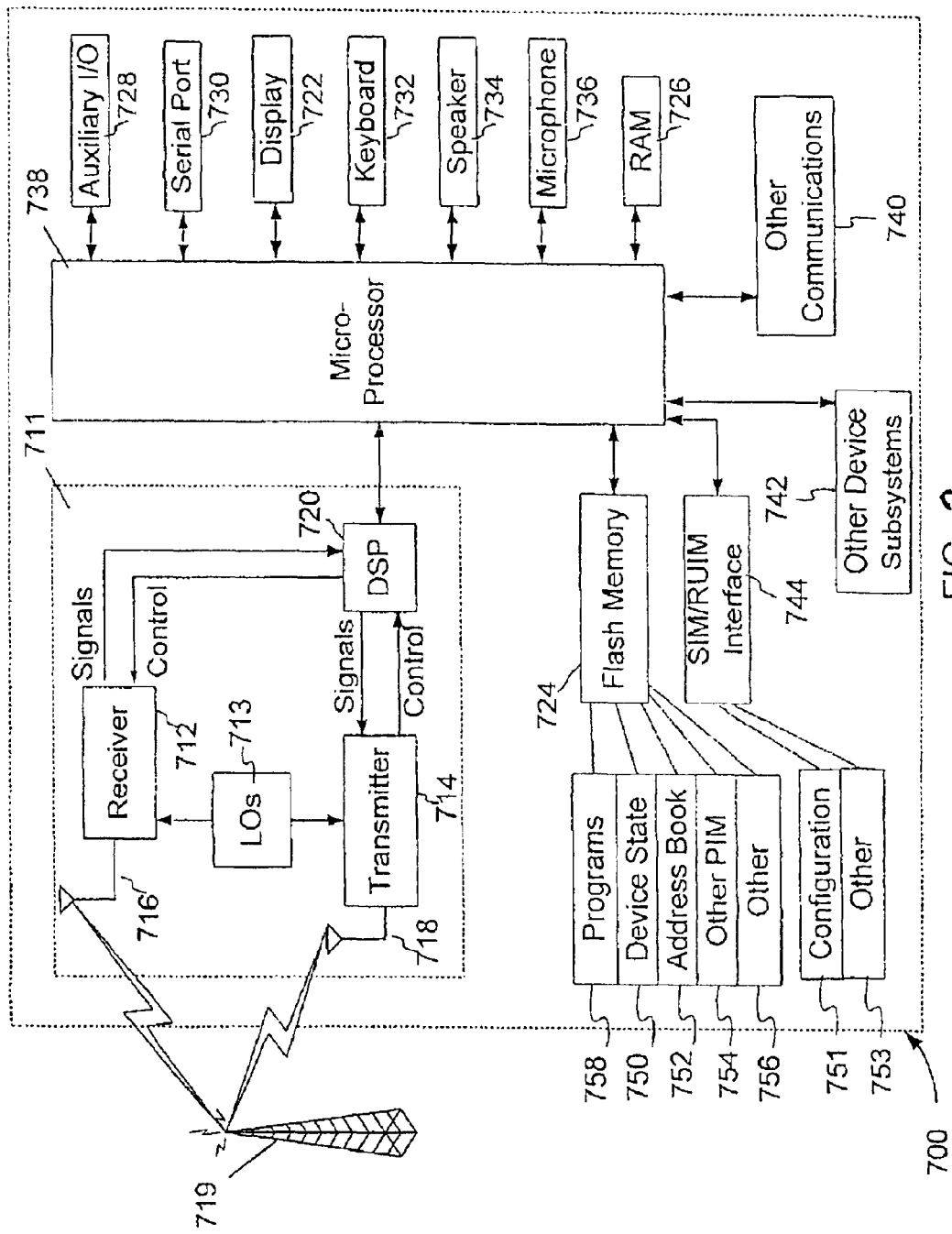
FIG. 2 is a block diagram of an exemplary mobile device implementing the method of the present disclosure.

Reference is now made to FIG. 2. FIG. 2 is a block diagram illustrating a mobile device that serves as an example of the type of device that may be used to implement the present disclosure. Mobile device 700 is preferably a two-way wireless communication device having voice and data communication capabilities. Mobile device 700 preferably has the capability to communicate with other computer systems on a data network. Depending on the exact functionality provided, the wireless device may be referred to as a data messaging device, a two-way pager, a wireless e-mail device, a cellular telephone with data messaging capabilities, a wireless data network appliance, or a data communication device, as examples.

When mobile device 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile device 700 may include a communication subsystem 711 designed to operate within networks such as UMTS or IS-2000 release A/onwards that support concurrent voice and packet data sessions.

Network access requirements will also vary depending upon the type of network 719. For example, in the Mobitex and DataTAC networks, mobile device 700 is registered on the network using a unique identification number associated with each mobile device. In UMTS and GPRS networks, and in some CDMA networks, however, network access is associated with a subscriber or user of mobile device 700. A GPRS mobile device therefore requires a subscriber identity module (SIM/USIM) card in order to operate on a GPRS /UMTS network, and a RUIM in order to operate on some CDMA networks. Without a valid SIM/USIM/RUIM card, a GPRS/UMTS/CDMA mobile device may not be fully functional. Local or non-network communication functions, as well as legally required functions (if any) such as "911" emergency calling, may be available, but mobile device 700 will be unable to carry out any other functions involving communications over the network 700. The SIM/USIM/RUIM interface 744 is normally similar to a card-slot into which a SIM/USIM/RUIM card can be inserted and ejected like a diskette or PCMCIA card. The SIM/USIM/RUIM card can have approximately 64K of memory and hold many key configuration 751, and other information 753 such as identification, and subscriber related information.

When required network registration or activation procedures have been completed, mobile device 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, other communication subsystem 740 such as a short-range communications subsystem and any other device subsystems generally designated as 742.

Some of the subsystems shown in FIG. 2 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on mobile device 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile device 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would preferably be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 2, would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices.

As will be appreciated by those skilled in the art, mobile device 700 is an example of the type of device envisioned to execute the present disclosure shown in FIG. 1. As such, mobile device 700 is adapted to store a list of emergency number in flash memory 724. Further, programs 758 include code adapted to run the process described above in relation to FIG. 1.

Network 719 is an example of the type of network envisioned for the present disclosure.

The embodiments described herein are examples of structures, systems or methods having elements corresponding to elements of the techniques of this disclosure. This written description may enable those skilled in the art to make and use embodiments having alternative elements that likewise correspond to the elements of the techniques of this disclosure. The intended scope of the techniques of this disclosure thus includes other structures, systems or methods that do not differ from the techniques of this disclosure as described herein, and further includes other structures, systems or methods with insubstantial differences from the techniques of this disclosure as described herein.

We claim:

1. In a mobile device, a method for sending a data message from said mobile device to at least one emergency contact, the method comprising the steps of:
   determining whether a mobile network of the mobile device supports concurrent circuit-switched and packet-switched communications, and whether a battery level of the mobile device is above a threshold, wherein the threshold is a battery level for which a data call will not adversely affect a voice call;
   if the mobile network supports concurrent circuit-switched and packet-switched communications and the battery level is above the threshold, , sending the data message to the at least one emergency contact during an emergency voice call;
   if the mobile network does not support concurrent circuit-switched and packet-switched communications and the emergency voice call is a circuit-switched voice call, sending the data message to the at least one emergency contact over a circuit-switched network;

wherein the at least one emergency contact is selected from a contact book of the mobile device.

2. The method of claim 1, wherein the data message is one of an email message, and instant message and a short message service (SMS) message.

3. The method of claim 1, wherein the data message includes:
   a timestamp; and
   a geographic indicator.

4. The method of claim 3, wherein the geographic indicator is derived from a global positioning system module on the mobile device.

5. The method of claim 4, wherein the geographic indicator is derived from the network the mobile device is connected to.

6. The method of claim 3, wherein the data message further includes an indicator for the type of emergency, said indicator derived from a number dialed for the emergency voice call.

7. The method of claim 3, wherein the data message further includes a list of emergency contacts.

8. The method of claim 7, wherein the list of emergency contacts is predetermined by a user.

9. The mobile device of claim 3, wherein the means for checking is configured to perform the checking repeatedly.

10. The method of claim 1, further comprising the step of, prior to said determining step, checking a user set parameter, said user set parameter having a first value to indicate the user wishes to send the data message and a second value to indicate the user does not wish to send the data message.

11. The method of claim 1, wherein if the mobile network does not support concurrent circuit-switched and packet-switched communications, checking for the first one of the mobile device connecting to a new network and the emergency voice call ending, and if the mobile device connects to a new network before the end of the emergency voice call, proceeding back to said determining step.

12. The method of claim 1, wherein the checking is performed repeatedly.

13. The method of claim 1, wherein, prior to the sending, the data message is created.

14. The method of claim 1, wherein, prior to the sending, the mobile device is configured to create the data message.

15. A mobile device configured to send a data message to at least one emergency contact, the mobile device having a radio subsystem including a radio configured to communicate with a mobile network; a radio processor having a digital signal processor and configured to interact with said radio subsystem; memory; a user interface; a processor configured to run user applications and interact with the memory, the radio and the user interface and, the mobile device characterized by having means for:
   determining whether the mobile network supports concurrent circuit-switched and packet-switched communications, and whether a battery level of the mobile device is above a threshold, wherein the threshold is a battery level for which a data call will not adversely affect a voice call;
   if the mobile network supports concurrent circuit-switched and packet switched communications and the battery level is above the threshold, sending the data message to the at least one emergency contact during an emergency voice call;
   if the mobile network does not support concurrent circuit-switched and packet-switched communications, sending the data message to the at least one emergency contact over a circuit-switched network;
   wherein the at least one emergency contact is selected from a contact book of the mobile device.

16. The mobile device of claim 15, wherein the data message is one of an email message, and instant message and a short message service (SMS) message.

17. The mobile device of claim 15, wherein the data message includes:
   a time stamp; and
   a geographic indicator.

18. The mobile device of claim 17, further comprising a global positioning system module, wherein the geographic indicator is derived from the global positioning system module.

19. The mobile device of claim 18, wherein the geographic indicator is derived from the mobile network the mobile device is connected to.

20. The mobile device of claim 15, wherein the data message includes an indicator for the type of emergency, said indicator being derived from a number dialed for the emergency voice call.

21. The mobile device of claim 15, wherein the data message includes a list of emergency contacts to the data message.

22. The mobile device of claim 15, wherein if the mobile network does not support concurrent circuit-switched and packet-switched communications, checking for the first one of the mobile device connecting to a new network and the emergency voice call ending, and if the mobile device connects to a new network before the end of the emergency voice call, proceeding back to said determining step.

* * * * *